United States Patent [19]
Ripley, Sr. et al.

[11] Patent Number: 6,134,834
[45] Date of Patent: Oct. 24, 2000

[54] HORTICULTURALLY DIVERSE GARDEN COMPRISING MICROENVIRONMENTS

[75] Inventors: Thomas L. Ripley, Sr.; Stephen A. Cataldo, both of Chalfont, Pa.

[73] Assignee: Greentech, Inc., Richmond, Va.

[21] Appl. No.: 08/468,713

[22] Filed: Jun. 6, 1995

[51] Int. Cl.⁷ ............................................. A01G 9/02
[52] U.S. Cl. ............................ 47/86; 47/66.1; 47/66.3
[58] Field of Search ........................ 47/86, 66 S, 83, 47/66 C, DIG. 13

[56] References Cited

U.S. PATENT DOCUMENTS

| | | | |
|---|---|---|---|
| Re. 35,006 | 8/1995 | Ripley, Sr. et al. ..................... | 47/66 |
| 84,002 | 11/1868 | Ryder ................................... | 47/86 |
| 152,758 | 7/1874 | Mills ..................................... | 47/86 |
| 1,129,554 | 2/1915 | Courtney ............................... | 47/79 |
| 2,960,797 | 11/1960 | Frehner ................................. | 47/83 |
| 4,118,892 | 10/1978 | Nakamura et al. ................... | 47/65.9 |
| 4,135,330 | 1/1979 | Aoyama ................................ | 47/33 |
| 4,396,653 | 8/1983 | Tomarin ........................... | 47/DIG. 13 |
| 5,187,894 | 2/1993 | Ripley, Sr. et al. ..................... | 47/86 |

FOREIGN PATENT DOCUMENTS

| | | | |
|---|---|---|---|
| 0361555 | 4/1990 | European Pat. Off. ................ | 47/86 |
| 163313 | 5/1958 | Sweden ............................... | 47/66 S |
| 0611117 | 5/1979 | Switzerland .......................... | 47/9 S |
| 0743662 | 6/1980 | U.S.S.R. ............................... | 47/66 S |

*Primary Examiner*—Michael J. Carone
*Assistant Examiner*—Joanne Downs
*Attorney, Agent, or Firm*—Woodcock Washburn Kurtz Mackiewicz & Norris LLP

[57] ABSTRACT

The present invention provides a horticulturally diverse garden for growing botanicals having a plurality of transportable modules, at least two of which provide differing microenvironments. The modules can comprise various soil compositions such that a variety of diverse botanicals can grow and thrive in close proximity. The present invention also provides for a garden which is irrigated from below the modules. The garden can also be heated or cooled underground. The present invention can also comprise a flexible plastic film or other transparent enclosure covering the top of the garden or modules. The modules may also comprise a synthetic surface.

16 Claims, 5 Drawing Sheets

HORTICULTURALLY DIVERSE GARDEN COMPRISING MICROENVIRONMENTS

REFERENCE TO PRIOR APPLICATIONS

This application is related to prior application Ser. No. 327,654, filed Oct. 24, 1994, U.S. Pat. No. 5,467,555 and to prior application Ser. No. 131,531, filed Oct. 4, 1993, patent Re 35006 which is a reissue application of U.S. Pat. No. 5,187,894, both of which are incorporated herein by reference.

FIELD OF THE INVENTION

This invention relates to horticulturally diverse gardens comprising systems of transportable modules having a mixture of soils and other components adapted to provide a proper growing environment for botanical species. It is now possible to create a horticulturally diverse garden containing a plurality of differing microenvironments in limited space.

BACKGROUND OF THE INVENTION

Existing gardens and botanical displays have several shortcomings with respect to diversity, mobility, and flexibility. First, they are limited in the diversity of botanical species which can be grown in close proximity to one another due to a variety of factors. Second, existing gardens and botanical displays are relatively immobile except for very small-scale operations. Third, existing gardens and botanical displays are often plagued with problems which are reflected in their lack of flexibility in adding or removing botanical species.

Numerous factors prevent the creation of a diverse garden or botanical display in which horticulturally diverse botanical species thrive in close physical proximity. These factors include soil and atmosphere temperature, soil pH, soil content, water, and sunlight. Natural conditions present in an environment generally do not allow for plants which grow in arid conditions to thrive in physical proximity to plants which grow in tropical conditions, thus preventing the growth of exotic plants from such different environments in close proximity. For example, natural growing environments do not allow for the growth of most species of cactus in proximity to most species of fern.

Existing techniques to broaden or enhance the diversity of plants growing in gardens include growing individual plant species in separate pots or similar containers, however this method does not provide for a continuous landscape effect, can be expensive, may not be aesthetically pleasing, and is generally wasteful of growing space. Thus, there is a need for an alternative means to broaden or enhance the range of botanical species growing in gardens.

Another major disadvantage of existing gardens is reflected in the permanence of the existing botanical species which are planted in a typical garden. It is impractical to move an existing garden to another location without irreparably harming the botanical species. Thus, if an individual desires to move a garden because of, for example, future construction on the site, the individual is forced to recreate the garden at the new site. Thus, there is a need to develop a system by which a botanical garden can be made mobile.

Another major disadvantage of existing gardens is reflected in the inflexibility of patterns and designs. Existing gardens are limited in that once a design has been achieved by planting botanical species, a large-scale design change is very difficult. If an individual decides to change a current garden design or arrangement by removing or adding a planted botanical species, the individual must dig up the botanical species to remove it from the garden. This presents a likely opportunity for the botanical to be damaged and can require extensive effort, depending upon the botanical species being removed. Thus, there is a need for a garden system whereby the redesign or rearrangement of the individual botanical species can be made with relative ease.

The present invention provides systems for growing environmentally diverse botanical species in close proximity, allowing each species to thrive by providing microenvironments tailored to such species. Thus, it is now possible to create a horticulturally diverse garden containing a plurality of differing microenvironments in limited space, which provide a means to grow and display exotic botanical species that do not naturally grow in close physical proximity.

The present invention also provides a means to construct highly mobile gardens which allows the gardens to be moved to other sites. In addition, the present invention provides for easy removal or addition of botanical species to the garden to allow for flexibility in changes of design or arrangement.

SUMMARY OF THE INVENTION

The present invention relates to a horticulturally diverse, integrated garden system comprising a plurality of integratable growing modules, at least two of said modules comprising different botanical species, said modules having means for removably attaching said modules to one another.

The present invention relates to a horticulturally diverse, integrated garden system comprising a plurality of modules, wherein at least two modules provide differing microenvironments.

The present invention relates to a horticulturally diverse, integrated garden system wherein at least some adjacent modules have significantly different pH's.

The present invention relates to a horticulturally diverse, integrated garden system wherein at least one module comprises standing water, or boggy soil.

The present invention relates to a horticulturally diverse, integrated garden system wherein at least one module comprises a botanical growing medium comprising at least about 50% dirt, about 10 to about 20% humus, about 5 to 20% sand, up to about 7% clay, up to about 5% silt, said dirt fraction being blended with at least 30% by volume of shaped pieces of expanded polymer selected to be substantially inert to plant growth chemistry.

The present invention relates to a horticulturally diverse, integrated garden system further comprising irrigation means for supplying water to said botanicals from below the surface of said modules.

The present invention relates to a horticulturally diverse, integrated garden system further comprising underground or under-module heating or cooling means.

The present invention relates to a horticulturally diverse, integrated garden system wherein said garden or individual modules further comprise flexible plastic film covering the top of at least some of the modules.

The present invention relates to a horticulturally diverse, integrated garden system further comprising a wall assembled from a plurality of modules.

The present invention relates to a horticulturally diverse, integrated garden system further comprising at least one module comprising a synthetic surface comprising rubber.

The present invention relates to a horticulturally diverse, integrated garden system comprising a plurality of integratable growing modules, at least two of said modules comprising different botanical species, irrigation means for supplying water to said botanicals from below the surface of the modules, and a plurality of said modules having a synthetic surface forming a pathway, wherein said modules has means for removably attaching the modules to one another.

Other embodiments will be apparent from a review of the present specification.

DETAILED DESCRIPTION OF PREFERRED EMBODIMENTS

Figure 1:
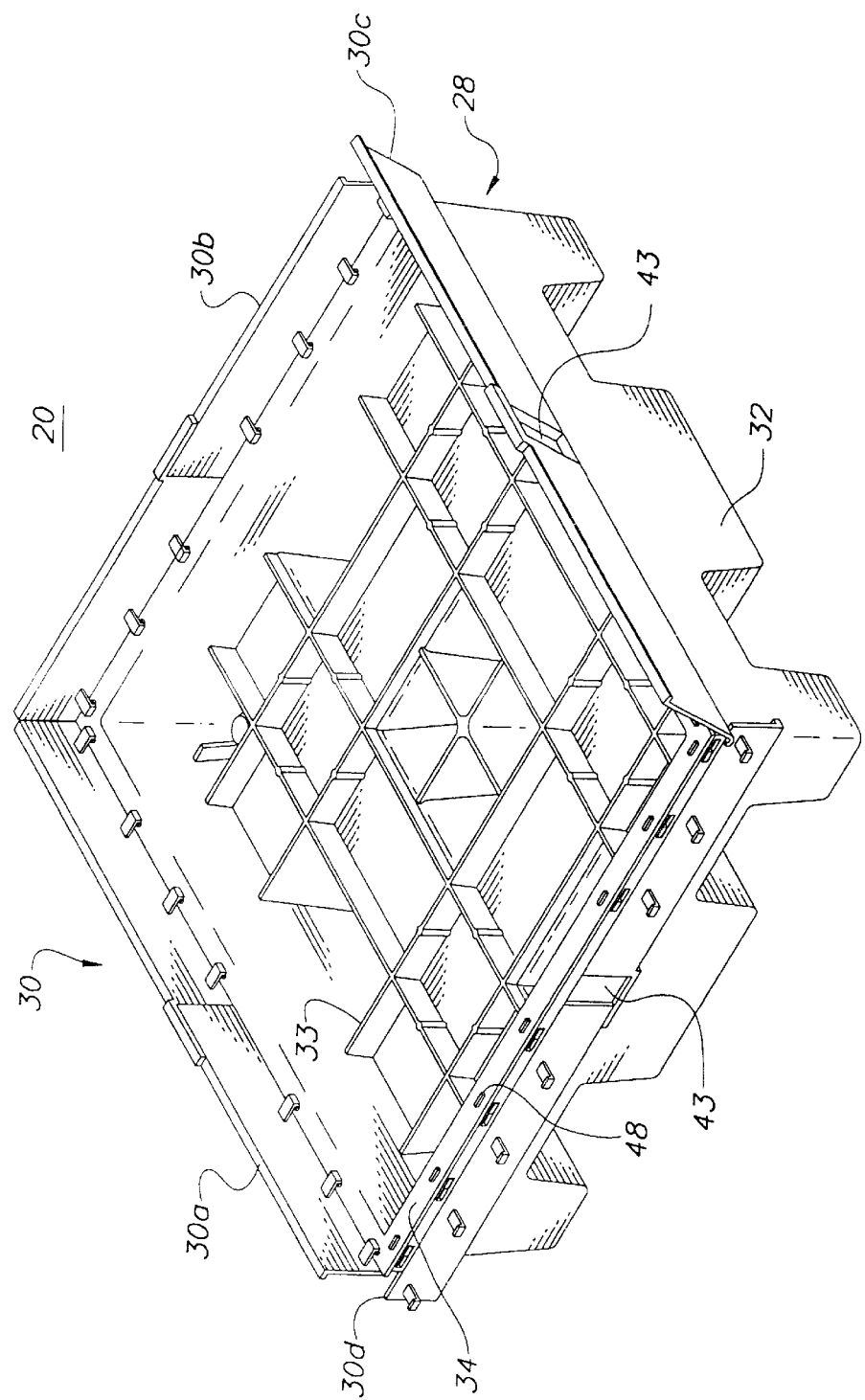
FIG. 1 depicts one preferred module for use in horticulturally diverse gardens in accordance with this invention.

As used herein, "horticulturally diverse garden" means a collection or grouping of different botanical species in close physical proximity, which can optionally include other non-botanical items. The horticulturally diverse garden may comprise botanicals which are not normally associated with each other in close proximity in nature. The horticulturally diverse garden comprises at least two microenvironments that allow different botanicals to grow in close proximity.

As used herein, "botanicals" and "botanical species" means species from the plant kingdom and includes the multitude of plant and fungal species. For example, botanicals include but are not limited to flowers, bushes, trees, vegetables, mushrooms, grasses, both passive and ornamental, as well as sports turfs and lawns.

As used herein, "microenvironments" means a small-scale environment that mimics or represents a naturally-occurring environment on Earth. For example, such microenvironments can contain biotic and edaphic factors which are present in the naturally occurring environment which the microenvironment either mimics or represents.

As used herein, "edaphic factors" means those factors which relate to the soil and include, for example, salinity, pH, and drainage.

As used herein, "significantly different pH" means pH values which differ by at least 0.2 or more pH units.

As used herein, "module", "growing module", or "integratable growing module" means a growing tray or pan in which botanicals grow and thrive. Modules can also contain non-botanical materials such as, for example, synthetic surfaces. The modules can be used in horticulturally diverse gardens. Modules in accordance with this invention preferably form an integrated gardening system wherein the integrated modules are interconnected with other integrated modules.

As used herein, "garden unit" means a module or growing pan which comprises a section of a horticulturally diverse garden containing a botanical.

As used herein, "boggy soil" means soil substantially saturated with water.

As used herein, the term "collar" means a sloping perimeter completely or partially circumscribing a horticulturally diverse garden comprised of at least one module having a sloping surface.

The present invention provides horticulturally diverse gardens comprising a plurality of modules comprising microenvironments in which a multitude of botanicals can grow and thrive in close physical proximity. The individual module is adapted for containing growing medium, such as soils or water or both, which is preferably adapted to be an effective medium for the growth of botanicals and to have a relatively light weight to facilitate transportation. At least some of the individual modules can comprise a synthetic surface, especially a rubberized surface, rather than a botanical.

The individual modules comprising the horticulturally diverse garden can be custom designed with respect to geometry and size. Preferred shapes are rectilinear, however, it will be appreciated that a wide variety of geometries can be employed in the utilization of modules of the present invention. Thus, while rectilinear modules are preferred, other geometries such as hexagons, trapezoids, and the like can be used to good effect. Tessellations and other arrays can be employed as well.

The modules can be growing trays, pans, or similar means for containing materials such as soil and water, which allow the growth of various botanical species. Preferred modules include the growing pans disclosed in related applications Ser. No. 327,654, filed Oct. 24, 1994, and Ser. No. 131,531, filed Oct. 4, 1993, which are incorporated herein by reference. The modules can be used for the horticulturally diverse garden.

The modules in accordance with the present invention, such as the growing trays, can be formed from many materials. Thus, a wide variety of metals, preserved woods, and plastics can be so employed. It is greatly preferred, however to employ plastics in the formulation of such units. A wide variety of plastics can be so employed although reinforced polyalkylenes, especially fiberglass reinforced polyethylene, are preferred. It will be appreciated that such materials can easily be molded, formed and the like, that they can be formulated inexpensively from recycled materials, that they are extremely tough, durable, and lightweight, that they are essentially inert to plant growth chemistry, and that they can be modified easily to accept wheels, clips, and other implementia which can be convenient in the practice of the present invention. Thus, it is preferred to provide integral growing trays to form the modules of the invention.

The modules generally comprise a growing tray having dimensions ranging from about one foot to about ten feet in length, from about one foot to about ten feet in width, and from about one inch to about five feet in depth. However, these dimensions are merely suggestive and the user can design modules with dimensions that are deemed appropriate for the user's needs.

The modules comprise a bottom plate and side walls which can be continuous with the bottom plate or fastened to the bottom plate by any fastening means. The bottom portion of the side walls can extend below the bottom plate and comprise spaces for the forks of a forklift or pallet jack to provide for easy transport. Alternatively, the bottom plate can be flush with the bottom of the side walls, wherein such a module comprises spaces in which the forks of a forklift or pallet jack can be placed to facilitate easy transport. The bottom plate preferably further comprises a plurality of drainage holes.

A preferred module is depicted in FIG. 1, which is also set forth in application Ser. No. 131,531, filed Oct. 4, 1993, which is a reissue application of U.S. Pat. No. 5,187,894, both of which are incorporated herein by reference. Referring to FIG. 1, the garden unit 20 includes a module 28 having side walls 32, which are preferably molded from a durable plastic material. Other forms of modules can be employed in accordance with this invention having different geometries and the like. As shown in FIG. 1, a baffling arrangement comprising baffles 33 is preferably provided within the interior of the module. Baffles 33 facilitate settling of growing medium, described below, within the module.

It may be preferable that growing medium be maintained at a significant height above the top of the side walls 32 of the module 28 while the garden unit is at another location, as well as during transport of the garden units to the garden site. Accordingly, fence 30 is connected to the module and, when in the "closed" position, provides a barrier for maintaining the growing medium, as well as the botanical plants, at the desired height above the side walls. With the fence in the closed position, growing medium and the botanical plants can be filled into the module up to a level near the top of the fence and maintained therein while the garden units are stored at another location. When it is desirable to assemble a horticulturally diverse garden, a plurality of modules are transported to the garden site or the like, preferably with the fence in the closed position. Just prior to assembly of the garden, the fence is moved into the "open" position in the manner described below to expose the growing medium and botanical plants at a significant height above the level of the top of the side walls 32.

Referring to FIG. 1, in a preferred embodiment fence 30 is connected to the top ledge 34 of the module 28 such that the outer peripheral surface of the fence 30 extends outwardly beyond the outer peripheral surface of the side walls 32 of the module. Preferably, the top ledge 34 is integrally molded with the side walls 32 of the module. Fence 30 comprises a plurality of fence sections 30a–30d, with a fence section being connected to the ledge 34 above a corresponding side wall 32 of the module. Each fence section of the fence 30 is hingeably connected to the ledge 34 of the module such that the fence sections are rotatable from the closed position to the open position and remain connected to the module when in the open position. As shown in FIG. 1, two of the fence sections 30a, 30b are in the closed position, while another section 30c is partially open and the fourth fence section 30d is in the open position.

Each fence section is further broken down into a long fence segment and a short fence segment. In order to facilitate rotation about the hinge of each of the fence sections from the closed position to the open position, the long and short fence segments are slidably engaged on the ledge 34. Thus, the long and short fence segments can be slid apart, leaving the opening 43 (FIG. 1). As shown with respect to fence section 30c of FIG. 1, the long and short fence segments of one of the fence sections are slid apart before the fence section is rotated to the open position. As shown, when the long and short fence segments are slid apart, a portion of each of the segments extends out beyond each of the transverse side walls such that either one fence section, or oppositely opposed fence sections, can only be rotated to the open position at a time. When the fence section 30d is rotated about the hinge to the open position the long and short fence segments are slid back together to facilitate opening of the adjacent fence sections. Accordingly, the fence sections remain movably connected to the modules when the garden units are installed to construct a horticulturally diverse garden, and the like.

The modules are preferably adapted to interlock to insure proper alignment and integrity but interlocking is not a necessity. The top of the side walls can contain a compression joint so that other modules can be joined to form a seamless garden. Alternatively, the modules can be fastened together with fastening means to form an integrated system. Any fastening means can be used which does not permanently attach one module to another. The fastening means will allow one module to be removably attached to another module. In a preferred embodiment, the fastening means comprise locator pads having a plurality of cone locators extending up from the locator pads. When the modules are placed into position to construct the garden, the modules are disposed onto the locator pads such that the cone locators are received in wells in the bottom surface of the modules. When the modules are a square shape, four cone locators at the corners of locator pads conveniently locate the modules into position and hold the modules in place adjacent each other.

Figure 2:
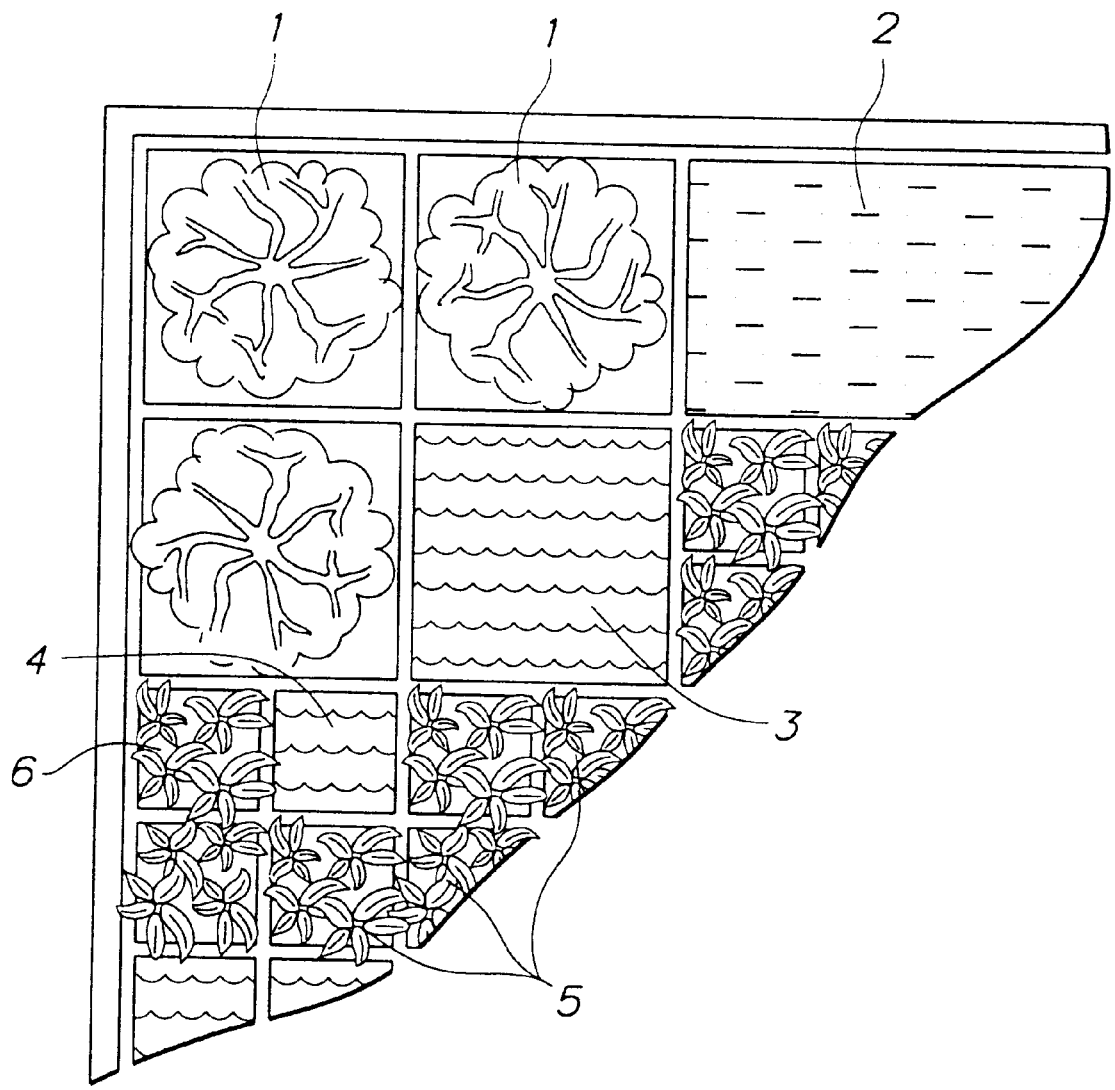
FIG. 2 depicts interaction among a plurality of modules, such as those depicted in FIG. 1, to form horticulturally diverse garden.

The modules can interact in a modular manner or in an integrated manner. FIG. 2 depicts the interaction among a plurality of garden units to form a horticulturally diverse garden. Each garden unit is comprised of a module into which growing medium and, optionally, a botanical is placed. For example, garden unit 1 can comprise trees or shrubs; garden unit 2 can comprise boggy soil; garden unit 3 can comprise water; garden unit 4 can comprise water, and which can also contain water as spillover from garden unit 3; garden unit 5 can comprise acid loving plants; and garden unit 6 can comprise base loving plants. This interaction provides for the formation of a horticulturally diverse garden in which diverse botanical species can thrive in close proximity in limited space. FIG. 2 also depicts the interaction of garden units wherein the modules are of varying sizes.

The modules of the present invention can bp and preferably are designed to be highly transportable. For example, if the user decides to replace a module with one that grows a different botanical, the module to be replaced is simply lifted out of the garden and replaced with the new garden module without disturbing the existing garden configuration. Commercial applications can include landscaping designs where a homeowner or a supplier would provide pre-planted or un-planted landscape modules and could substitute desired modules for undesired modules.

In accordance with the present invention, it is preferred to employ botanical growing media which are especially formulated to be, at once, excellent media for the growth of botanicals and to have a relatively light weight when compared to natural soils. Accordingly, the modules of the present invention can optionally be filled with custom mixtures of soil to facilitate growth of any desired botanical. It will be appreciated that soil for the growth of botanicals is predominately dirt with varying amounts of sand, clay, decomposed organic matter, nutrients, minerals, fertilizers, herbicides, pesticides, and the like. Likewise, the soils can vary in their water content, sand content, and other soil composition depending on the requirements of the botanical. The present invention allows for diverse botanicals, such as turf, plants, flowers, vegetables, water gardens, shrubs, grasses, etc., to be integrated into a garden while still maintaining different soil types so as to allow each to thrive and be properly maintained. Thus, it will be appreciated that botanical growing media should have pH in the range of 5.0 to 7.0, especially 6.0 to 7.0, and contain primary, secondary and minor nutrients. The medium should have a low to medium salt concentration and be free of contaminants detrimental to botanical growth. It is also greatly preferred that the growing medium have drainage. Heretofore, there has been no great desire for botanical growing media to have particular light weight characteristics. It is now desired to transport substantially entire botanical species complete with growing media and a containment element in the form of a garden unit. Accordingly, there is now a great desire to provide growing medium having all of the desirable properties of ordinary media but also having relatively light weight.

In accordance with this invention, the botanical growth media may be comprised of at least two fractions. The first fraction, called the dirt fraction, comprises at least about 50% dirt, preferably at least about 75% dirt. The dirt fraction further comprises, in accordance with preferred embodiments, from about 10 to about 20% humus, up to about 7% clay, up to about 5% silt, and up to about 40% sand. The sand is preferably in the 0.25–1 mm range with the major proportion of the sand being less than about 0.5 mm. As will be appreciated by persons skilled in the art, acceptable growing medium may be prepared having no silt, or no clay, or no sand, an indeed without humus in some cases although balanced mixtures of the foregoing are greatly preferred. In accordance with other preferred embodiments, the dirt is present in an amount of about 70 to 80% by weight with humus being present of about 10–15% by weight with about 3–7% clay, about 2–5% silt, and about 5–20% sand.

The dirt fraction is blended with at least about 30% by volume of shaped pieces of expanded polymer. The expanded polymer is selected to be one which is substantially inert to plant growth chemistry and which is relatively stable over time. Thus, plastics which leak toxic compositions or which degrade toxically over time are to be avoided. It is also preferred that the expanded plastic have a very low specific gravity, that is that it have a very large volume per unit weight. An ideal plastic for this purpose is expanded polystyrene commonly known as "styrofoam". Such plastic products include, for example, those similar to the GREENSPEC® light weight specifications, including foam peanuts and the like available from Greenway Services Inc., Horsham, Pa. The expanded polymer is present in the form of shaped pieces rather than as a bulky solid. It is preferred that the expanded plastic be in shaped pieces having average dimension larger than about ¼" and preferably in a range of from about ½" to about 2". The particular shape of the expanded polymer is not critical; any convenient shape including broken or deformed shapes may be employed. It will be widely recognized that such expanded polymers are commonly available and are commonly used as packing material for fragile objects. Accordingly, there exists a recyclable waste stream of such expanded polymers which may be tapped for inclusion in the growing media in accordance with this invention. The dirt fraction comprises at least about 40% by volume of the total botanical growth media in accordance with this invention with the expanded polymer comprising at least about 30% by volume of the media. It is preferred that media be provided having at least about 40% expanded polymer with roughly 50:50 mixtures by volume of dirt fraction and expanded polymer being most preferred.

A preferred embodiment of the present invention provides horticulturally diverse, integrated garden system wherein at least one module comprises a botanical growing medium comprising at least about 50% dirt, about 10 to about 20% humus, about 5 to 20% sand, up to about 7% clay, up to about 5% silt, said dirt fraction being blended with at least 30% by volume of shaped pieces of expanded polymer selected to be substantially inert to plant growth chemistry.

The resulting botanical growth media has been found to be excellent media for the growth of botanicals providing all of the properties which are required for such growth. In addition, the weight of the growing mixture is vastly decreased over that of the corresponding material without the expanded polymer. Accordingly, the weight demands on the growing modules of the present invention are minimized. Concomitant ease of transportation is provided.

The botanical growth media of the present invention may be used for other purposes in addition to the garden system set forth herein. Thus, they may be employed in any circumstances where botanical growth is desired but relatively low weights are preferred. Thus, such medium may be used in roof top gardens in planters and in many other circumstances. Since the expanded polymers used in the growing media of the present invention are easily compressible, these mixtures are preferred for use in constricted containers for all-season exposure. As will be appreciated, freezing water in rigid containers may cause destruction of the containers through expansion of the freezing water. The expanded polymers of the present invention remain preferably deformable even under very cold conditions such that freezing water may deform the polymers rather than the containers containing them.

In a preferred embodiment, at least one module of a horticulturally diverse garden comprises acid soil. In another preferred embodiment, at least one module of a horticulturally diverse garden comprises slightly acid soil. In another preferred embodiment, at least one module of a horticulturally diverse garden comprises neutral soil. In another preferred embodiment, at least one module of a horticulturally diverse garden comprises alkaline soil. It is understood that the horticulturally diverse garden can comprise a plurality of modules comprising different soil types which allow for the diversity of the garden. The modules of the present invention can be made available with or without a particular soil composition. For example, the modules of the invention may be packaged with a particular soil composition. Alternatively, the modules may be packaged without any soil. In addition, any soil composition may be packaged separately and used with the modules of the present invention.

Examples of differing soil types and those species of botanicals that would most benefit from the modular horticulturally diverse garden are based principally upon soil pH. A soil with an acid pH is generally one in which the pH is about 5.0. Species of trees, for example which are adapted to this type of soil include: andromeda, azalea, bayberry, beech, birch, bittersweet, Kousa dogwood, hemlock, American holly, Japanese holly, blue hydrangea, holly inkberry, juneberry, juniper, leucothoe, larch, mountain laurel, Japanese maple, red maple, oak, pachysandra, Japanese pieris, pine, eastern rosebud, rhododendron, serviceberry, and Norway spruce. However, this list is merely illustrative and is not exhaustive.

A soil with a slightly acid pH is generally one in which the pH is about 6.5. Species of trees, for example which are adapted to this type of soil include: arborvitae, European mountain ash, ash, bayberry, boxwood, flowering cherry, cinquefoil bush, clematis, cotoneaster, flowering crabapple, flowering dogwood, euonymus, douglas fir, forsythia, ginkgo, hawthorn, hydrangea, European linden, Norway maple, sugar maple, myrtle, scarlet oak, Bradford pear, periwinkle, Austrian pine, flowering plum, potentilla, privet, spirea, blue Colorado spruce, Serbian spruce, sweet gum, sycamore (planetree), viburnum, vinca, yew (taxus) and a variety of grasses and turfs. However, this list is merely illustrative and is not exhaustive.

A soil with a neutral pH is generally one in which the pH is about 7.0. Species of trees, for example which are adapted to this type of soil include: abelia, ajuga, bugleweed, cranberry bush, Cornelian cherry dogwood, firethorn, Oregon hollygrape, honeylocust, Boston ivy, English ivy, lilac, mockorange, Russian olive, pyracantha, tall hedge, cranberry viburnum bush, black walnut, pussy willow, wisteria and a variety of grasses and turfs. However, this list is merely illustrative and not exhaustive.

The modules of the present invention can be made available pre-planted or un-planted as desired by the user or distributor.

The modules of the present invention can be made "solid", i.e., without drainage holes or with valve drainage, so that the module can contain water and be used in conjunction with water gardens, waterfalls, fountains, etc. The modules can comprise various species of botanicals, such as, for example, water lilies and the like which are able to thrive in a water environment. The water gardens can optionally be supplemented with compounds and mediums, such as, for example, minerals, fertilizers, and the like to further facilitate their growth in water. The modules can also contain animal species such as fish, frogs, snakes and the like. In addition, a module or a plurality of modules containing water can be used in connection with other modules containing soils or can be used alone.

In another embodiment, the present invention provides that the garden can be irrigated such that water reaches the botanicals from below the modules. In this embodiment a liner, such as polyethylene tarp and the like, can be placed, if desired, beneath the modules and the modules are irrigated by standard irrigation techniques wherein the water delivery means is below the modules. This provides that the modules can be flood irrigated from below to conserve water, i.e., reduce evaporation, and reduce wet foliage and reduce fungus attacks. The liner prevents additional consumption of water by the ground below. This liner can be particularly useful in arid climates where water is in short supply. Drip or capillary irrigation can also be employed.

In another embodiment, the present invention also provides that the garden can be heated or cooled from beneath the ground to modify the temperature of the soil to further facilitate the growth or maintenance of the botanicals. In this embodiment, a heating or cooling unit is used in conjunction with a circulator to force air through the forklift channels with and without the means of flexible tubing. The heating or cooling unit and the circulator can be one unit or separate units. The tubing need not run the entire length of the forklift channel. The effect of forcing heated or cooled air under the soil of the modules will be to modify the temperature of the soil such that the growth or maintenance of the botanicals will be effected. For example, forcing heated air under the modules will prevent or reduce soil freezing. In addition, cooling the soil promotes heat tolerance which can be the case in bentgrass in southern climates.

In another embodiment, the present invention also provides that a flexible plastic film or other transparent enclosure can be used in cooperation with the modules preferably along with forced air to keep the botanicals warm and growing. The flexible plastic film or other transparent enclosure will be lightweight such that the forced air inflates the plastic film to provide a dome-like environment for the botanicals. The height of the dome can vary from one inch to several feet. The flexible plastic film can be made from a variety of lightweight plastic materials. This "greenhouse effect" will also prevent snow from building up on the modules and provide additional sources of water for irrigation. This embodiment also allows for the continual growth of the botanical in climates where temperature and other conditions do not normally allow such growth.

The modules of the present invention can be used for other purposes in addition to the garden system set forth herein. Thus, they can be employed in any circumstances where plant growth is desired, but relatively low weights are preferred. Thus, such modules can be used in roof top gardens, in planters and in many other circumstances. The modules can be prefabricated to fit together as the modules interlock to form a continuous wall while providing vegetable, shrub, etc. or water gardens. The modules can also be prefabricated to serve as a unit for a waterfalls. The modules can also comprise site amenities such as, for example, bicycle rails, benches, sitting walls, trash recepticals, tables, or portions of other larger apparatus of similar nature, or any combination thereof.

Figure 3:
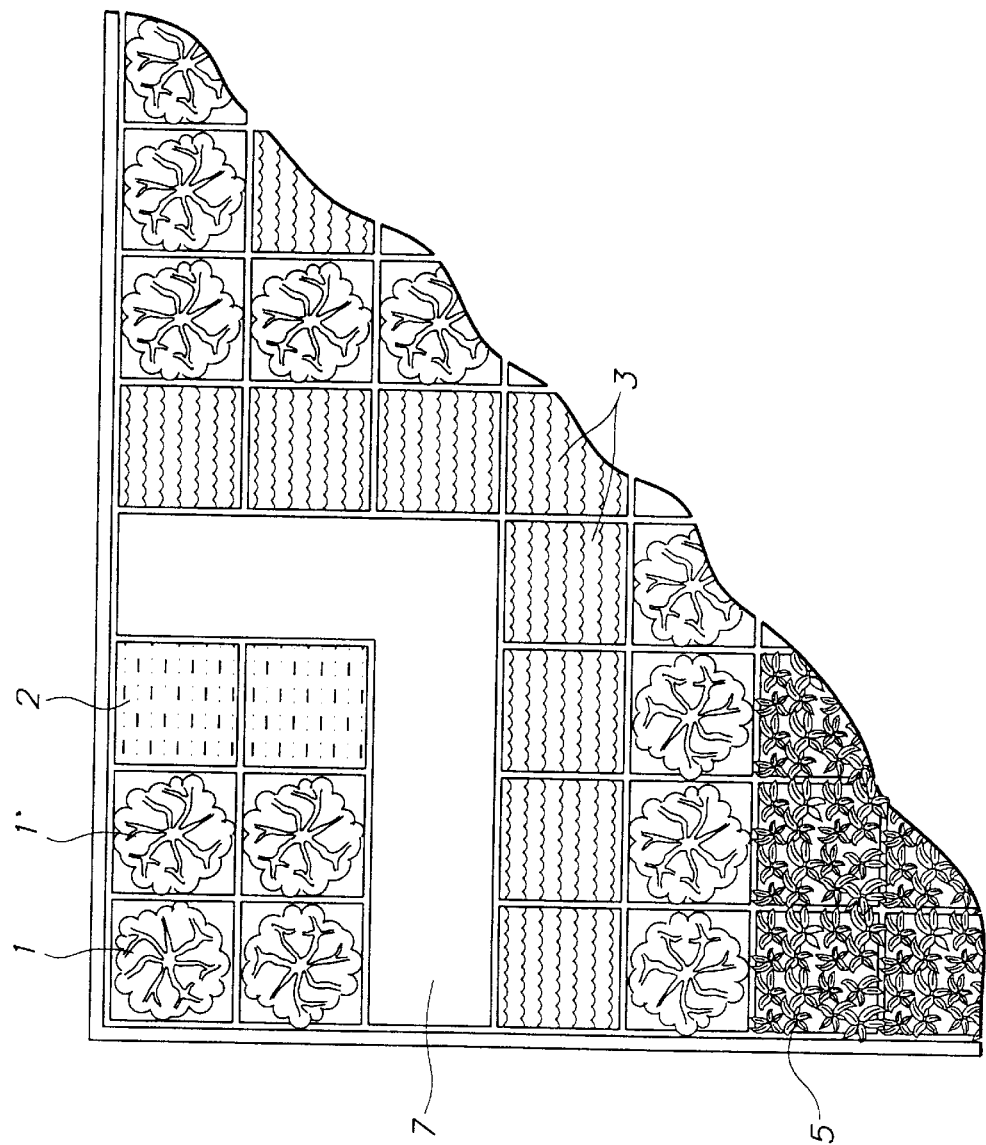
FIG. 3 depicts a horticulturally diverse garden comprising a plurality of modules having a variety of botanicals and further comprising modules forming a pathway, such as one comprising a synthetic rubberized surface.

The present invention also provides a horticulturally diverse garden comprising at least one module having a synthetic surface. A module having a synthetic surface can be randomly integrated within a horticulturally diverse garden or can be formed into a pattern to create, for example, a cartway or pathway. For example, FIG. 3 depicts a horticulturally diverse garden comprising a plurality of garden units: garden unit 1 can comprise trees or shrubs; garden unit 2 can comprise boggy soil; garden unit 3 can comprise water; and garden unit 5 can comprise acid loving plants. FIG. 3 also depicts a plurality of modules having a synthetic surface forming a seamless pathway 7, dividing the garden. The pathway can take any shape or be of any length as desired.

Synthetic surfaces can be prepared from synthetic materials known to those skilled in the art and are known per se. The synthetic surfaces can be manufactured such that they conform to the cavity of any module thus forming a tight fit with the module while preferably remaining removable from the module. The synthetic surface preferably overlaps the module such that no part of the module may be seen from a top view. This allows adjacent modules having a synthetic surface to form a seamless pathway or cartway. The synthetic surface is preferably rubberized or comprises a rubber.

Figure 4:
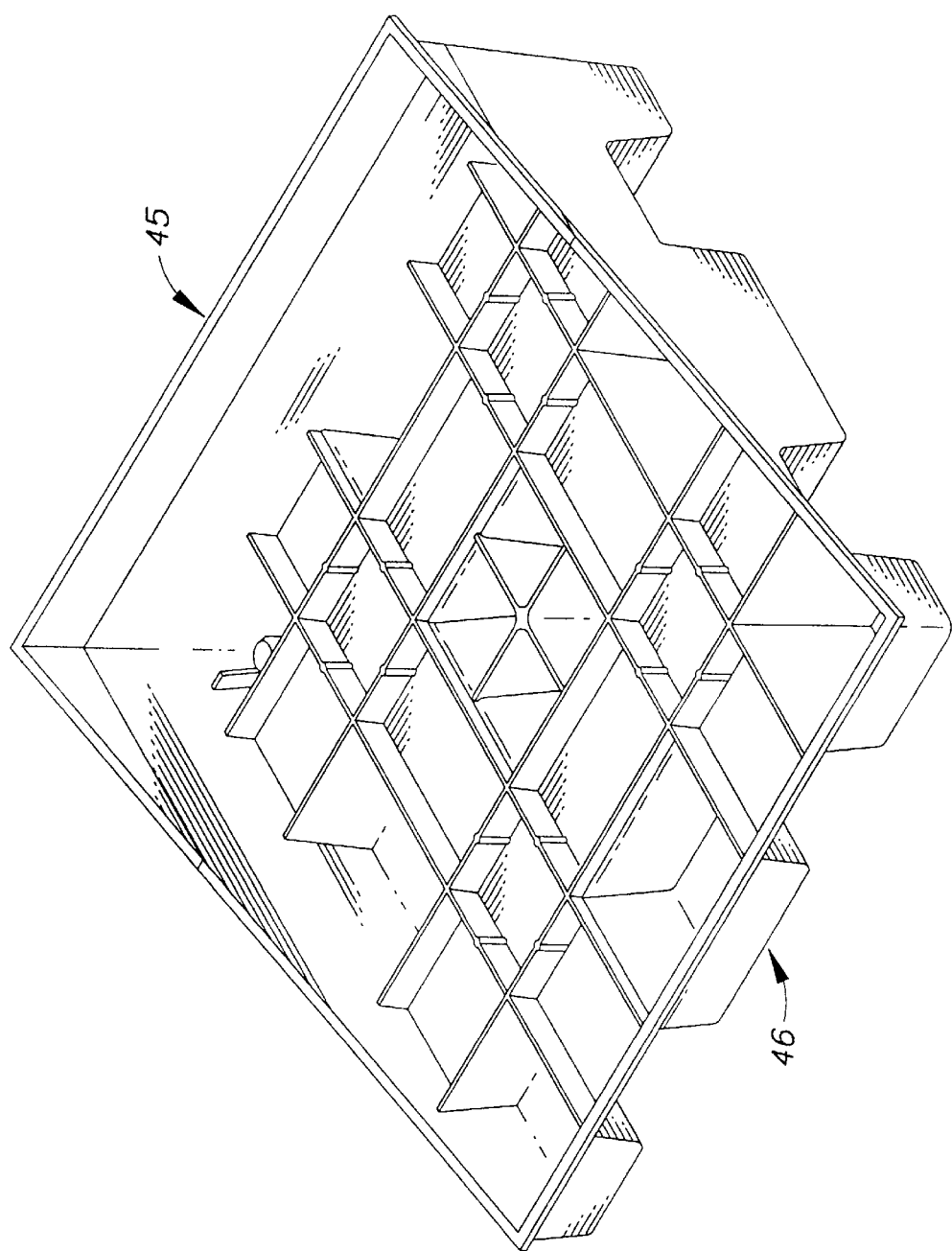
FIG. 4 depicts a preferred module useful in forming a sloping perimeter around horticulturally diverse garden.

The present invention also provides a horticulturally diverse garden comprising a connecting collar surface on the outside edge of freestanding modular, garden. Such a collar forms a sloping perimeter partially or completely circumscribing a garden. A preferred module for use in such a collar or sloping perimeter is depicted in FIG. 4. The module depicted in FIG. 4 may comprise the same features as those set forth in FIG. 1. The module, as shown in FIG. 4, has a backwall 45 that is higher than the frontwall 46, thus forming a sloping surface. The height of the frontwall and backwall can be varied according to the needs of the user. The slope can be variable, as determined by varying the height of the frontwall and/or backwall, and can range between about 10° to 60°.

Figure 5:
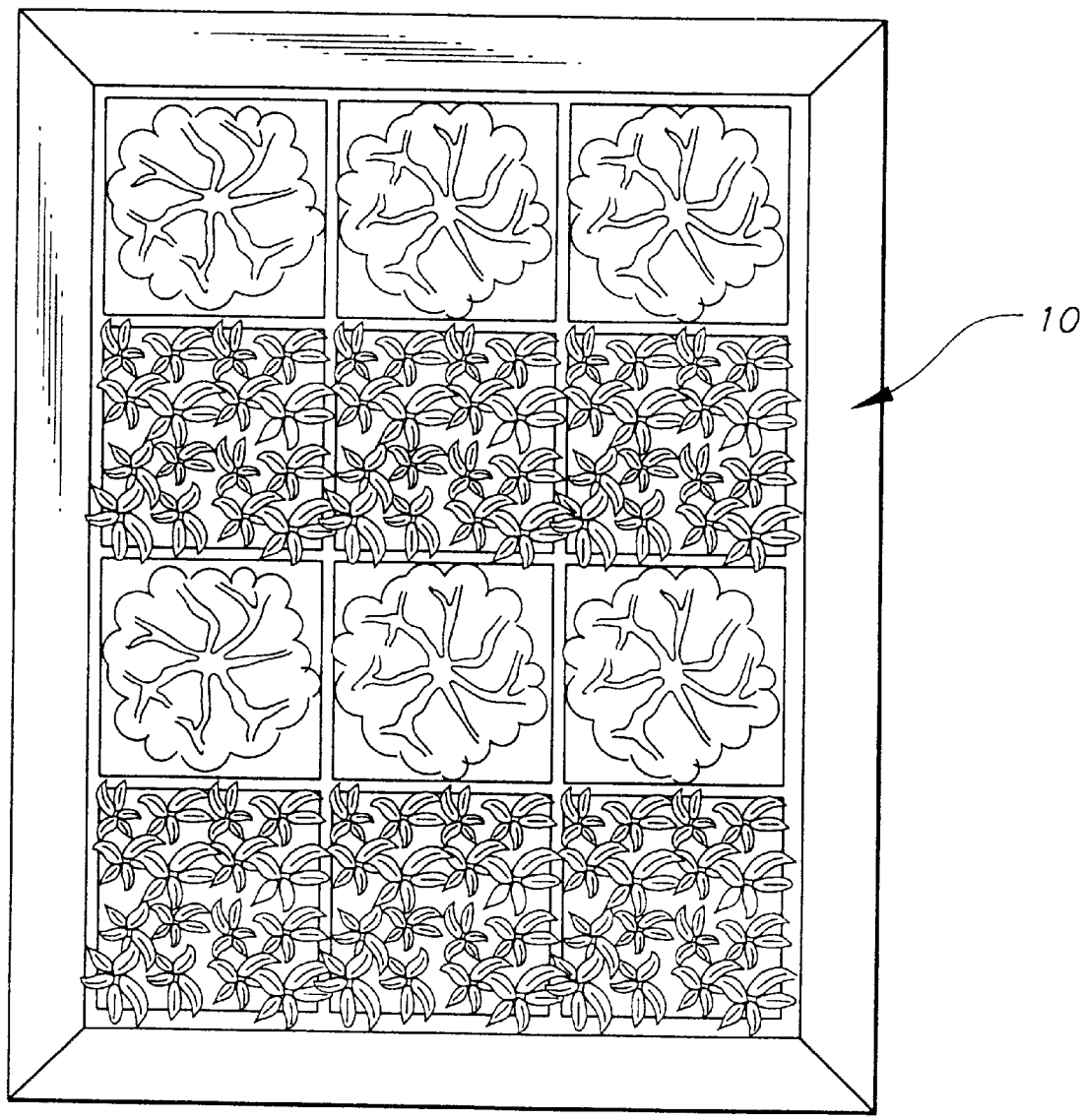
FIG. 5 depicts horticulturally diverse garden comprising a sloping perimeter comprising synthetic surface or turf.

The backwall of the modules comprising the collar interfaces with the existing garden structure. FIG. 5 depicts a top view of a horticulturally diverse garden comprising a collar, or sloping perimeter, comprising a plurality of modules, such as those depicted in FIG. 4. The garden unit modules are elevated with respect to the frontwall of the collar modules thus forming a sloping perimeter circumscribing the garden. The collar can completely circumscribe the existing garden or may only partially circumscribe the existing garden. In addition, the collar can simply form a ramp-like structure interacting with the existing garden, such as, for example, forming a ramp to a pathway. The modules comprising the collar can contain a synthetic surface or a turf. The synthetic surface preferably overlaps the module such that no part of the module may be seen from a top view. This allows adjacent collar modules having a synthetic surface to form a seamless pathway or cartway.

Those skilled in the art will appreciate that numerous changes and modifications can be made to the preferred embodiments of the invention and that such changes and modifications can be made without departing from the spirit of the invention. It is therefore intended that the appended claims cover all such equivalent variations as fall within the true spirit and scope of the invention.

What is claimed is:

1. A horticulturally diverse, integrated garden system comprising a plurality of integratable growing modules, at least two of which comprise different botanical species, said modules comprising:

bottom plate and side walls;

means for removably attaching the modules to one another; and a fence attached to top of said side walls extending outwardly beyond outer peripheral surface of said side walls.

2. The garden system of claim 1, wherein at least two of said modules provide differing microenvironments.

3. The garden system of claim 1, wherein at least one module comprises acid soil.

4. The garden system of claim 1, wherein at least one module comprises slightly acid soil.

5. The garden system of claim 1, wherein at least one module comprises neutral soil.

6. The garden system of claim 1, wherein at least one module comprises alkaline soil.

7. The garden system of claim 1, wherein at least one module comprises standing water or boggy soil.

8. The garden system of claim 1, wherein at least one module comprises a botanical growing medium comprising:

at least about 50% dirt;

about 5 to 20% sand;

about 10 to about 20% humus;

up to about 7% clay;

up to about 5% silt;

said dirt fraction being blended with at least 30% by volume of shaped pieces of expanded polymer selected to be substantially inert to plant growth chemistry.

9. The garden system of claim 1, wherein the garden further comprises irrigation means for supplying water to said botanicals from below the surface of said modules.

10. The garden system of claim 1, wherein the garden further comprises underground heating or cooling means.

11. The garden system of claim 1, wherein the garden or individual modules further comprise flexible plastic film covering the top of said garden or modules.

12. The garden system of claim 11, wherein the flexible plastic film is transparent.

13. The garden system of claim 1, wherein the garden further comprises wall assembled from a plurality of modules.

14. The garden system of claim 1, wherein the garden further comprises at least one module having a synthetic surface comprising rubber.

15. The garden system of claim 1, wherein the garden further comprises at least one module having an item selected from the group consisting of benches, trash recepticals, tables, bicycle rails, sitting walls, and portions of other larger apparatus of similar nature, or any combination thereof.

16. A horticulturally diverse, integrated garden comprising:

a plurality of integratable growing modules, at least two of said modules comprising different botanical species;

irrigation means for supplying water to said botanicals from below the surface of said modules; and a plurality of said modules having a synthetic surface forming a pathway;

said modules having means for removably attaching the modules to one another.

* * * * *